United States Patent [19]
Okun et al.

[11] 3,723,853
[45] Mar. 27, 1973

[54] SCR TAP CHANGING VOLTAGE REGULATOR

[75] Inventors: Sigizmund Semenovich Okun; Boris Nikolaevich Sergeenkov; Valentin Mikhailovich Kiselev, all of Moscow; Vasily Sergeevich Ivanov, Leningrad; Vladimir Yakovlevich Vorobiev, Krasnogorsk Moskovskoi oblasti, all of U.S.S.R.

[73] Assignee: Moskovsky ordent Lenina Energetichesky Institut, Moscow, U.S.S.R.

[22] Filed: Mar. 22, 1972

[21] Appl. No.: 236,814

[30] Foreign Application Priority Data

Jan. 13, 1970 U.S.S.R. ............................ 1393168

[52] U.S. Cl. .................. 323/20, 323/24, 323/43.5 S
[51] Int. Cl. .............................................. G05f 1/20
[58] Field of Search ............... 323/20, 24, 43.5 S, 45

[56] References Cited

UNITED STATES PATENTS

| | | | |
|---|---|---|---|
| 3,340,462 | 9/1967 | Ebersohl | 323/43.5 S |
| 3,375,437 | 3/1968 | Mellott et al. | 323/43.5 S |
| 3,619,765 | 11/1971 | Wood | 323/43.5 S |

*Primary Examiner*—A. D. Pellinen
*Attorney*—Holman & Stern

[57] ABSTRACT

Voltage regulation is effected by means of a transformer with its taps connected to alternately switched silicon controlled rectifiers. One rectifier corresponds to a lower voltage in the load circuit and is driven to a conducting state at the beginning of each half-cycle, while the other operates at a higher voltage in the load circuit. For regulation the input voltage and output current phases are compared and a signal proportionate to this phase difference is formed which is added to the average input voltage. At the same time, the input voltage is integrated for each time instant. The total voltage is compared with the reference voltage to obtain a difference signal which, in its turn, it compared with the integrated voltage, and the higher voltage rectifier is driven into conduction after the difference resulting from this comparison attains a preset level. The regulator includes an integrator, an adder, a difference voltage detector, and a reference voltage source which are connected to form a control system of the pulse-width modulator rendering the rectifier conductive at a higher voltage in the load circuit.

2 Claims, 2 Drawing Figures

SCR TAP CHANGING VOLTAGE REGULATOR

The present invention relates to improvement in A.C. voltage regulation and transformer-based voltage regulators and can be used for voltage regulating applications in a wide power range.

A widely known means presently in use is regulation of A.C. voltage with the aid of a transformer, for example, an autotransformer with alternately switched silicon controlled rectifiers mounted at its output, The lower voltage rectifier starts to conduct at the beginning of a current half-cycle; the rectifier corresponding to a higher voltage is rendered conductive as soon as a difference between the reference and the average half-cycle output voltages attains a predetermine value.

A device for accomplishing such regulation is a closed-circuit control system employing negative feedback. The negative feedback is introduced by a control circuit incorporating a transformer output meter, a reference voltage source, and a voltage comparator for comparing the output and reference voltages, the output of the comparator being connected to the pulse-width modulator. On a signal from the comparator, the pulse-width modulator renders the higher voltage rectifier conductive for a given half-cycle with a view to balancing a deviation of the regulation voltage from the preassigned value depending on the reference voltage magnitude.

Such a device fails to provide rapid and efficient stabilization of the voltage output when operating into a low-impedance inductive load.

This disadvantage results from the fact that thyristors, semistors and other semiconductor elements used in voltage regulators as the basic actuating devices are essentially a fixed-lag section so that after being driven to a conducting state at some moment of a primary voltage half-cycle, they can cease to conduct only if the power current has reversed its direction. Practically, a lag in operation of these rectifiers in such a closed-circuit control system as the feedback system described above can be assumed to cover one entire half-cycle of the A.C. voltage being stabilized.

In order that a sufficient stability margin can be obtained in cases when a fixed lag is present, the regulation device must necessarily include a lag-lead circuit (first-order aperiodic circuit) with a large time constant.

The minimum time constant in such a circuit may be given by $$T_{min} = (1/2f) \cdot (\Delta U/\delta) \qquad (1)$$

where $\Delta U$ = relative change of the primary voltage at which the output voltage is regulated.

$\delta$ = relative accuracy of output voltage regulation.

$f$ = frequency of the A.C. supply.

For practical purposes, it would be necessary to appreciably increase this time constant in order to eliminate a significant difference between the instants at which the thyristors start to conduct in two subsequent half-cycles, because the time constant as given by equation (I) cannot provide stable operation unless ideal conditions are secured, i.e. infinitely large power in the primary circuit and a purely resistive load.

In conditions other than those specified self-sustained oscillations at the fundamental and second harmonics of the supply frequency appear across the regulator output. For suppressing these oscillations in physical regulating systems the time constant must be made three to four times as large as the time constant calculated from equation (I).

Particular difficulties are involved in ensuring the stability of a voltage regulator operating into an inductive load with a low impedance.

Then, in the case of transients, temporary appearance of the D.C. component in the output voltage brings about corresponding aperiodic transients at the inductive load impedance. If the inductive load has a low resistance, damped oscillations with a small damping factor are built up in the load current phase which results in periodic variations of the load current reversal instants and, consequently, of the instants when the higher voltage rectifier ceases to conduct. These variations may be amplified by the regulator which factor causes periodic components with a magnitude larger than the rated current to set up in the load current. The most adverse situation from the viewpoint of operation stability arises when the time constant of the load circuit is equal to the time constant of the lag-lead circuit.

It is an object of the present invention to provide reliable regulation of voltage across a low-impedance inductive load and to generally speed up regulation response.

The present invention is aimed at developing a new means for voltage regulation for controlling the output voltage of a load circuit and for modifying the voltage so controlled in accordance with input voltage conditions of this load circuit, as well as to provide a voltage regulator to accomplish the above regulation.

To attain the foregoing and other objects, the present invention is embodied as follows: for voltage regulation the input voltage and output current phases are compared, a voltage signal proportionate to this phase difference is formed and added to the average input voltage, the integrated input voltage is obtained for each half-cycle at each instant, the difference between the reference and total voltages is compared with the integrated voltage obtained, and the higher voltage rectifier is turned on as soon as the difference resulting from this comparison attains a preset level.

The above is also a more reliable and efficient means of voltage regulation in a resistive-inductive load circuit by using a difference between the input voltage and output current phases.

The proposed means for regulating A.C. voltage consists in the following: a voltage regulator comprising a transformer with taps alternately switched by silicon controlled rectifiers of which the one corresponding to a lower load voltage starts to conduct at the beginning of each current half-cycle, while the other rectifier rated for a higher voltage is driven to its conducting state by a pulse-width modulator connected to this rectifier and having an output signal control system which incorporates a reference voltage source and an average half-cycle voltage pickup, has a control system which comprises an input voltage integrator in series with a comparator to compare the input voltage and output current phases generating a voltage signal proportionate to this phase difference, and a voltage adder connecting also an average half-cycle voltage pickup, the outputs of the adder and the reference voltage source are coupled to a difference signal detector with the output thereof electrically connected with the integrator output, while both the adder and the reference voltage source are coupled to a control input of the pulse-width modulator due to which the latter is turned on as soon as voltages in their output circuits become equal.

The invention may best be made clear from the following description of a preferred embodiment of an A.C. voltage regulator with reference to the accompanying drawings wherein.

Figure 1:
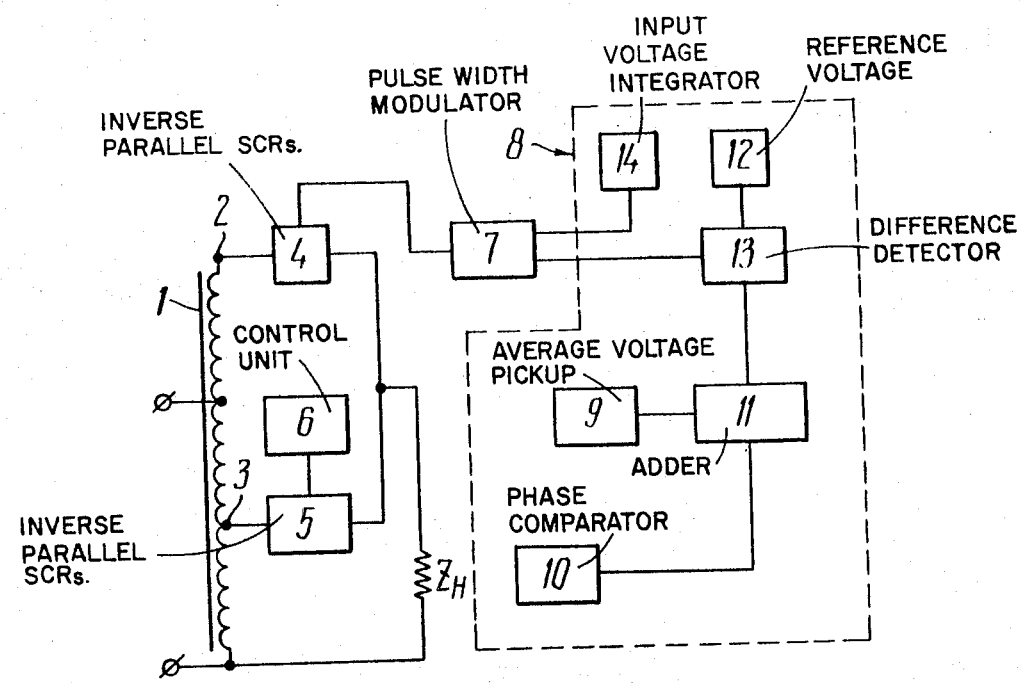
FIG. 1 is a block diagram of a voltage regulator for accomplishing voltage regulation according to the invention.

The voltage regulator comprises an autotransformer 1 with taps 2 and 3 for a higher and a lower steps of voltage control across a load $Z_H$. The tapes are connected to the load $Z_H$ via silicon controlled rectifiers 4 and 5, the rectifier 5 being used for lower voltage control and the rectifier 4, for higher voltage control. The rectifiers 4 and 5 are so interlinked that when the rectifier 4 is switched into conduction, the rectifier 5 ceases to conduct, while the rectifier 5 is rendered conducting by a rectifier control unit 6 as soon as the rectifier 4 is cut off.

Conduction of the rectifier 4 is controlled by the output signals of a pulse-width modulator 7 having a control system 8.

The control system 8 includes an average half-cycle voltage pickup 9, a phase comparator circuit 10 which compares the phases of an input voltage $U_I$ and an output current $I_2$ of the regulator and generates voltage proportional to a difference between the voltage and current phases. The pickup 9 and the comparator 10 are connected to an adder 11 responsible for summing up their outputs. The outputs of the adder 11 and the reference voltage source 12 are coupled to a difference signal detector 13 which is connected with the input of the pulse-width modulator 7.

The control system 8 also incorporates an integrator 14 for integrating an input voltage at each instant in each half-cycle which is connected to the input of the pulse-width modulator 7 similar to the difference signal detector 13.

Figure 2:
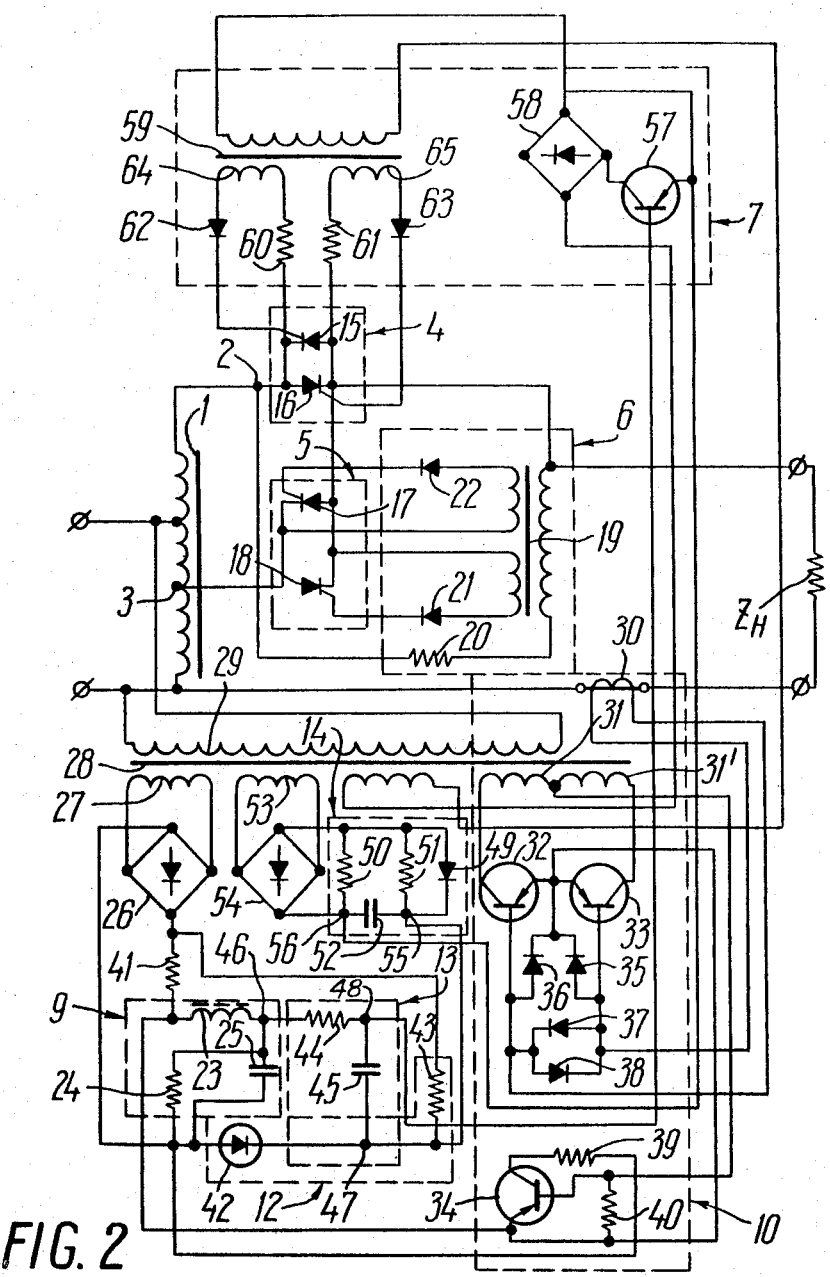
FIG. 2 is a schematic diagram of one preferred embodiment of a voltage regulator according to the invention.

FIG. 2 represents a circuit diagram of the regulator.

The rectifier 4 consists of two thyristors 15 and 16 connected in parallel opposition; the rectifier 5 uses thyristors 17 and 18 coupled in an identical fashion.

When the rectifier 4 is cut off, the rectifier 5 is triggered to a conducting state by the rectifier control unit 6 the basic component of which is a peaking transformer 19 with the primary winding thereof shunting the thyristors 15 and 16 via a resistor 20 and the secondary connected through diodes 21 and 22 into the control circuits of the thyristors 17 and 18.

The average half-cycle voltage pickup 9 is made up by an inductor 23, a resistor 24 and a capacitor 25 and coupled via a rectifier bridge 26 across a secondary 27 of a transformer 28 with its primary 29 coupled to the input of a transformer 1.

A comparator circuit 10 effecting comparison of the input voltage and output current phases is composed of a current transformer 30, secondary windings 31 and 31' of the transformer 28 placed in series, transistors 32, 33 and 34, diodes 35, 36, 37 and 38, resistors 39, and 40, the transistor 34 serving as the output of the comparator circuit 10. When the input voltage and the load current are in-phase conduction voltage is furnished to the transistor 34 and an additional voltage drop caused by current flowing through a resistor 39 appears at the resistor 41, as a result of which voltage delivered to the inductor 23 and the capacitor 25 goes down. On the other hand, when the input voltage and the load current are out-of-phase, the transistor 34 is cut off, and the resistor 41 passes only the current from the inductor 23 which sets up a small voltage drop at the inductor, the result being a rise of voltage applied to the inductor 23 and capacitor 25.

In this case the capacitor 25 performs essentially the functions of the adder summing up the signal of the pickup 9 and that of the comparator 10.

The capacitor 25 is in series relation with the reference voltage source 12 composed of a Zener diode 42 and a resistor 43. The input of the reference voltage source 12 is connected to the output of the rectifier bridge 26.

The difference voltage detector 13 is comprised of a resistor 44 and a capacitor 45, its input being terminals 46 and 47, while terminals 47 and 48 serve as an output.

The integrator 14 comprises a diode 49 and two resistors 50 and 51 separated by a capacitor 52, the diode 49 shunting the resistor 51 to provide full discharge of the capacitor 52 at the end of each input voltage half-cycle. Power supply of the integrator 14 is from a secondary winding 53 of the transformer 28 through a rectifier bridge 54.

The characteristics of the capacitor 52 and the resistor 51 are selected such that the instantaneous value of voltage at the capacitor 52 is described by the relationship:

$$U_{52} = \frac{1}{K_{52}} \int_{t_0}^{t_1} U_I \cdot dt, \qquad (2)$$

where
$K_{52}$ = proportionality factor,
$U_I$ = input voltage;
$t_0$ = beginning of an input voltage half-cycle;
$t_1$ = instant when a control signal appears at the input of the pulse-width modulator.

$t_1$ is the time moment when voltages at the capacitors 52 and 45 become equal. At this instant a control signal is sent to the input of the modulator 7 for triggering the rectifier 4 to conduction.

In order to switch on the modulator 7 at the instant $t_1$ the outputs of the integrator 14 and detector 13 must be connected in series relation across the input of the pulse-width modulator 7, for which purpose the output terminal 47 is coupled to an integrator terminal 55 and the terminal 48 to one input of the pulse-width modulator 7, the other modulator input being connected across an integrator terminal 56.

The pulse-width modulator 7 is composed of a transistor 57, a rectifier bridge 58, a transformer 59 with resistors 60, 61 and diodes 62, 63 in its secondaries 64 and 65 connected into the control circuits of the thyristors 15 and 15.

When the voltage at the capacitor 52 is lower than that at the capacitor 45 back voltage is impressed upon the emitter-base junction of the transistor 57 and, as a result, the rectifier 4 is not driven to its conducting state. Since the instant $t_1$ when voltage at the capacitor 52 reaches the level maintained at the capacitor 45 the transistor 57 starts to conduct and the rectifier 4 is rendered conductive by the control pulse of the modulator 7.

In order to obtain a preset degree of stabilization accuracy, it is required to select an appropriate capacitance of the capacitor 45 depending on the capacitance of the capacitor 52.

The voltage at the capacitor 45 must be so related to the input voltage $U_I$ that the instant $t_1$ of the voltage of the capacitor 52 reaching that of the capacitor 45 is sufficiently accurately described by the equation:

$$U_2 = (U_I/2)[\ k_\alpha + k_\beta + (k_\beta - k_\alpha)\ \cos\omega t_1] \quad (3)$$

where:
$k_\alpha$ = transformation ratio of the autotransformer 1 corresponding to a lower voltage;
$k_\beta$ = transformation ratio of the transformer 1 corresponding to a higher voltage;
$U_2$ = output voltage of the regulator;
$\omega$ = angular frequency of the supply mains.

To satisfy equation (3), one must have $$U_{45} = k_{45}(U_I - U_{I\ min}),$$

where:
$U_{45}$ = voltage at the capacitor 45;
$k_{45}$ = proportionality factor;
$U_{I\ min}$ = minimum input voltage.

The relationship between the proportionality factors $k_{45}$ and $k_{52}$ must be such as to obey the condition $$k_{45}/k_{52} = \frac{k_\beta}{k_\beta - k_\alpha} \quad (4)$$

In order to improve voltage regulation accuracy across a mixed load, for instance, resistive-inductive load, conduction of the rectifier 4 must somewhat lag the instant of initiation of conduction when a purely resistive load is employed.

Then, the necessary condition is $$U_2 = (U_1/2)[2k_\beta + (k_\beta - k_\alpha)\ \cos\omega t_1 + (k_\alpha - k_\beta)\cos\omega t_{oo} \quad (5)$$

where:
$t_{oo}$ = time interval equivalent to the difference between the output current and input voltage phases.

A required lag can be provided by selecting appropriate characteristics of the resistors 41 and 39. For practical purposes, the above condition is met if $R_{41} \approx 0.5 R_{39}$.

Consider now the operation of the regulator which is illustrated in FIG. 2 of the drawings.

With the regulator working into a purely resistive load when the voltage and current are in-phase, the rectifier 5 is rendered conductive at the beginning of each half-cycle of the regulated voltage and a voltage corresponding to the lower voltage is applied to the load $Z_H$. The transistor 34 acting as the output of the comparator 10 is conducting and the voltage from the bridge 26 is applied through the resistor 41 to the inductor 23 and the capacitor 25. The voltage at the capacitor 25 is compared with the reference voltage of the Zener diode 42 and the resulting difference is sent via a resistor 44 to the capacitor 45. Meanwhile the capacitor 52 charges for integrating the input voltage within each half-cycle at each time instant.

At the end of each half-cycle after the output voltage of the bridge 54 has dropped to zero, the capacitor 52 of the integrator 14 discharges through the diode 49 and the resistor 50. As long as voltage across the capacitor 52 is below the voltage of the capacitor 45, the transistor 57 is cut off by back voltage applied to its emitter-base junction.

When voltage across the capacitors 52 and 45 become equal the transistor 57 of the pulse-width modulator 7 is rendered conductive, the modulator starts to produce control pulses to be sent to the thyristors 15 and 16 of the rectifier 4, and the latter is driven to conduction. As a result, the conducting thyristors 17 and 18 of the rectifier 5 receive back voltage and cease to conduct, and a voltage corresponding to the higher voltage is sent to the load circuit.

When, apart from the resistive component, the reactive component is also present in the load $Z_H$ (a resistive-inductive load), initiation of conduction of the rectifier 4 occurs somewhat later as compared with a purely resistive load.

In case the current and voltage are out-of-phase, the transistor 34 of the comparator circuit is cut off and voltage at the capacitor 25 is higher as against the current and voltage being in-phase. This, in turn, will cause an increase in the difference between the reference voltage and the voltage at the capacitor 25 in proportion to the current and voltage phase difference and, consequently, the voltage at the capacitor 45 rises. As a result, the voltage of the integrator capacitor 52 reaches the level of voltage at the capacitor 45 with a certain lag relative to the beginning of the half-cycle as compared with the regulator operating into a resistive load, and the rectifier 4, likewise, starts to conduct with a lag.

What we claim is:

1. A means for regulating A.C. voltage in a load circuit using a transformer with its taps connected to alternately switched silicon controlled rectifiers corresponding to a lower and a higher voltages respectively, whereby a lower load voltage rectifier is turned on at the beginning of each current half-cycle, an average half-cycle voltage is determined, the input voltage and the output current phases are compared, a voltage signal proportionate to this phase difference is formed and added to said average half-cycle voltage, the total voltage resulting from the above addition is compared with the reference voltage to obtain a difference signal, the input voltage is integrated within each half-cycle for each time instant and compared with said difference voltage, and the higher voltage rectifier is driven to its conducting state as soon as the difference resulting from this comparison attains a preset level.

2. A voltage regulator for controlling the A.C. voltage of a load circuit comprising, a transformer with taps; silicon controlled rectifiers connecting said load circuit to the transformer taps, one of said rectifiers rated at a higher voltage being triggered to conduction at the beginning of each half-cycle and the other corresponding to a higher voltage in said load circuit; a pulse-width modulator included in the control circuit of said other rectifier to drive the latter to a conducting state, a control system for controlling the output of said pulse-width modulator comprising a reference voltage source, an average half-cycle voltage pickup, an input voltage integrator, a comparator for comparing the input voltage and output current phases, an adder which adds the input voltage and output current signals, a difference voltage detector, said phase comparator generates a voltage signal proportionate to this phase difference and is connected in series relation across said adder which also connects the average voltage pickup, while the outputs of the adder and the reference voltage source are coupled to the difference voltage detector with the output thereof having electric connection with the integrator output, said integrator and difference voltage detector are connected to the control input of said modulator to turn the latter on when their output voltages become equal, as a result of which said modulator renders conductive said other rectifier, thereby, maintaining constant voltage in the load circuit.

* * * * *